July 16, 1957     MASAZO TANGO     2,799,087
PIPING LENGTH MEASURING DEVICE

Filed Nov. 18, 1954     3 Sheets-Sheet 1

INVENTOR
MASAZO TANGO
BY Wenderoth, Lind & Ponack
ATTORNEYS

July 16, 1957  MASAZO TANGO  2,799,087
PIPING LENGTH MEASURING DEVICE
Filed Nov. 18, 1954  3 Sheets-Sheet 2
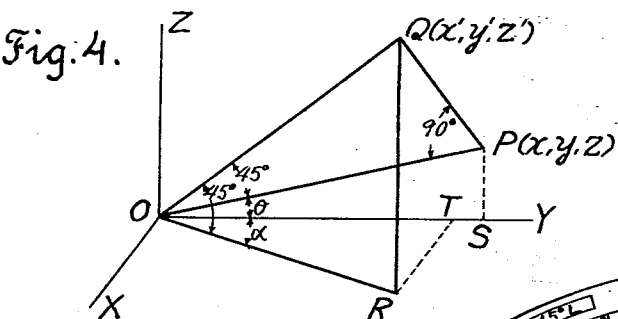
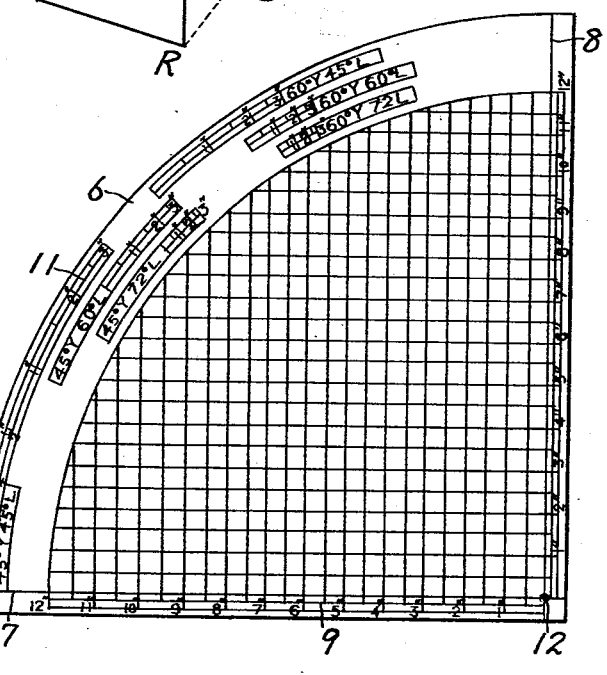
MASAZO TANGO
INVENTOR.
BY Wenderoth, Lind & Ponack
ATTORNEYS July 16, 1957  MASAZO TANGO  2,799,087
PIPING LENGTH MEASURING DEVICE
Filed Nov. 18, 1954  3 Sheets-Sheet 3

INVENTOR
MASAZO TANGO
BY Wenderoth, Lind & Ponack
ATTORNEYS

United States Patent Office 2,799,087
Patented July 16, 1957

2,799,087

PIPING LENGTH MEASURING DEVICE

Masazo Tango, Nuttari-machi, Niigata-shi, Japan

Application November 18, 1954, Serial No. 469,700

1 Claim. (Cl. 33—1)

My invention relates to a piping length measuring device and has for its object to provide a piping length measuring device, which consists of a coordinate plate having curved graduations between coordinate axes, each of which shows the relation between the slope of the main pipe and the projection of the branch angle of a Y pipe to the horizontal plane varying in accordance with said slope, which is necessary for keeping the end of the branched pipe vertical, and having graduations of length on said coordinate axes, a bend angle plate which has the bend angle of a bend pipe connected with the branch end between angle sides and having graduations of length on said angle sides, and an auxiliary scale having a graduation of length.

A chief advantage of the present invention is that by using said device anyone can easily measure the necessary piping lengths for a piping system on the desk, in which the main pipe is branched by using a Y pipe and the end of a bend pipe at the branch end is kept vertical, and is most efficient in case of said main pipe having a slope.

Other objects and advantages of this invention will be apparent from the following description and from the drawings, in which:

Fig. 4 and Fig. 5 are diagrammatic views for explanation of the principle of the invention;

Fig. 6 is a plan view of a coordinate plate;

Fig. 7 is a plan view of a 45° bend angle plate;

Figure 1:
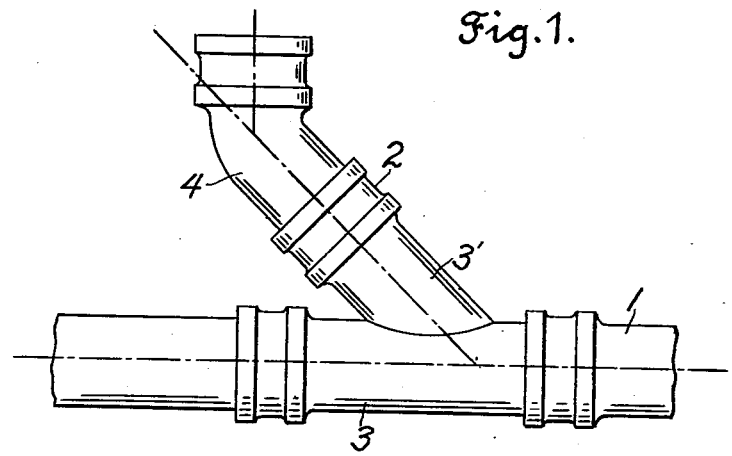
Figure 1 is an elevational view of a piping system, in which a 45° bend pipe is connected with a 45° branch pipe.

In Fig. 1, the numerals 1 and 2 denote the main pipe and the branched pipe, respectively, at which branch a Y branch pipe 3 is used, and a bend pipe 4 is used at the end of said branched pipe keeping said end vertical in order to be able to connect it with a vertical pipe. It is assumed for simplifying the explanation of my invention that a Y branch pipe of 45° branch angle, namely 45° Y is used and a bend pipe of 45° bend angle, namely 45° L or ⅛ bend is connected with the end of the branched portion 3′ of said branch pipe.

Figure 2:
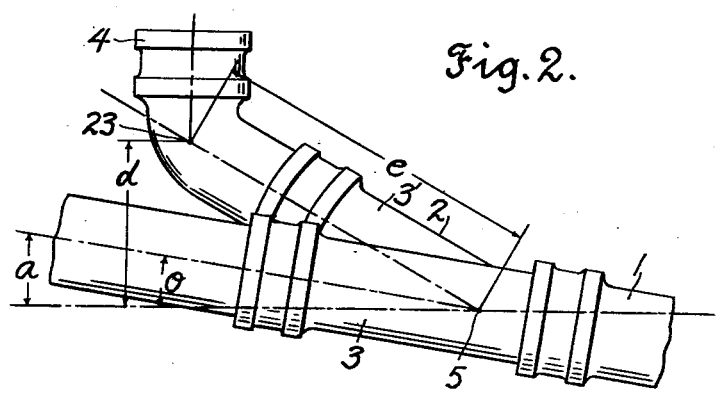
Fig. 2 is an elevational view of said piping system in case that a slope is given to the main pipe and the end of said bend pipe is kept vertical.
Figure 3:
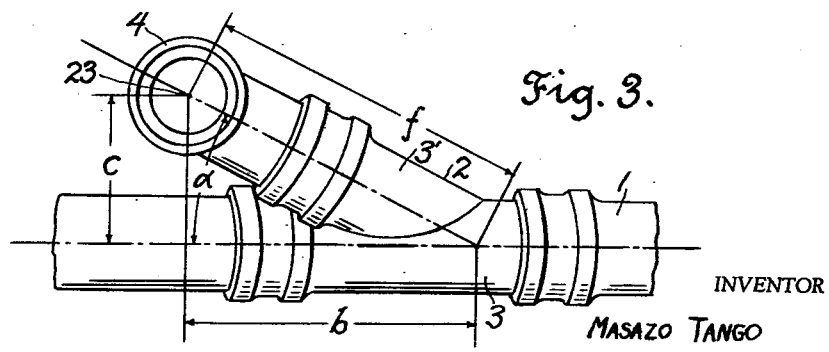
Fig. 3 is a plan view of the above.

In case of the main pipe 1 being horizontal as shown in Fig. 1, when the plane including both the axes of the Y pipe 3 and the bend pipe 4 is vertical, the end of said bend pipe is vertical, but it will of course incline if a slope is given to said main pipe. It is required to make said end vertical for the sake of connecting it with a vertical pipe, for which purpose, as shown in Figs. 2 and 3, the end of the branched portion 3′ must be kept as same in height as before by rotating the Y pipe 3 in the clockwise direction, and also, the plane including both the axes of the bend pipe 4 and the branched portion 3′ must be kept vertical by rotating said bend pipe in the counter-clockwise direction; then the projection of the branch angle to the horizontal plane, which is zero in the state shown in Fig. 1, becomes $\alpha$ $\theta$ denotes the slope angle of said main pipe.

For obtaining the relation between $\alpha$ and $\theta$ above stated, it is assumed that, in Fig. 4, the coordinate origin O is located at the intersection point 5 of the axes of the Y pipe 3 and that lines OP and OQ represent said pipe, an angle OPQ being 90° and an angle between OQ and the XY plane being 45° equal to the bend angle of the bend pipe 4 and also, the projection of the point Q to the XY plane being R, then $$P\hat{O}Q = 45°; P\hat{O}S = \theta; \text{ and } R\hat{O}T = \alpha$$

If $\theta$ is varied by moving OP in the YZ plane, $\triangle OQR$ will move holding its vertical state and varying $\alpha$, as QR must be constant and vertical.

Let the coordinates of the points P and Q be $x$, $y$, $z$ and $x'$, $y'$, $z'$, respectively and $h$ indicate QR, then from the theorem of the solid analytical geometry $$PQ = \sqrt{(x'-x)^2 + (y'-y)^2 + (z'-z)^2} \quad (A)$$

As $\triangle OPQ$ and $\triangle OQR$ are both right-angled isosceles triangles and will form such a square as shown in Fig. 5, if they are developed, $PQ = QR = h$
$x' = RT = OR \sin \alpha = h \sin \alpha$
$y' = OT = OR \cos \alpha = h \cos \alpha$
$z' = QR = h$
$x = 0$
$y = OS = OP \cos \theta = h \cos \theta$
$z = PS = OP \sin \theta = h \sin \theta$ Accordingly, from the Formula A $$h = \sqrt{h^2 \sin^2 \alpha + (h \cos \alpha - h \cos \theta)^2 + (h - h \sin \theta)^2}$$

By solving this equation $$\cos \alpha \cos \theta + \sin \theta = 1$$

or $$\cos \alpha = \sec \theta - \tan \theta \quad (B)$$

Namely, in case of using the 45° Y and the 45° L, the slope angle $\theta$ of the main pipe 1 and the projection $\alpha$ of the branch angle to the horizontal plane are in such relation as shown by this formula for keeping the end of the bend pipe 4 vertical, and therefore, for example, if the slope of said main pipe is ⅛ inch, $\alpha$ will be obtained by means of the trigonometrical function table by inserting $\theta$, which is obtained from said table calculating $\tan \theta = \text{⅛} \times \text{1/12}$, into the Formula B.

In Fig. 6, the numeral 6 indicates a coordinate plate of sector shape representing the XY plane, on which coordinate axes 7 and 8 intersecting each other at the right angle and having graduations 9 and 10, respectively, for example, of one foot length are drawn. The ends of said graduations are connected quadrantally, in which range longitudinal and lateral graduation lines are drawn. Provided on the outer quadrantal part of said plate is a curved graduation 11, which is constructed by marking slopes corresponding to $\alpha$ obtained from the Formula B in case of using the 45° Y and 45° L. Similarly, other curved graduations are provided corresponding to various combinations of Y pipes and bend pipes. The numeral 12 shows a pin standing on the origin.

In Fig. 7, the numeral 13 denotes a bend angle plate of triangular shape representing $\triangle OQR$ and having 45°, which is the bend angle of said 45° L, between angle sides 14 and 15. Provided on its oblique side 15 and perpendicular side 16 are graduations 17 and 18, respectively, in inches, and in the triangle thus formed, longitudinal and lateral graduation lines are drawn. The numeral 19 shows a hole which is made on the vertex and is to be put on the pin 12 of the coordinate plate 6.

Figure 8:
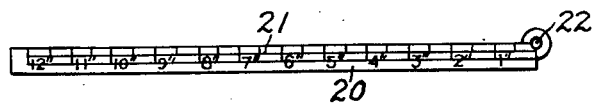
Fig. 8 is a plan view of an auxiliary scale.

In Fig. 8, the numeral 20 indicates an auxiliary scale having the same graduation 21, namely in inches, as those of the coordinate plate 6 and the bend angle plate 13, and providing a hole 22 on its zero end to be put on the pin 12 of said coordinate plate.

Figure 9:
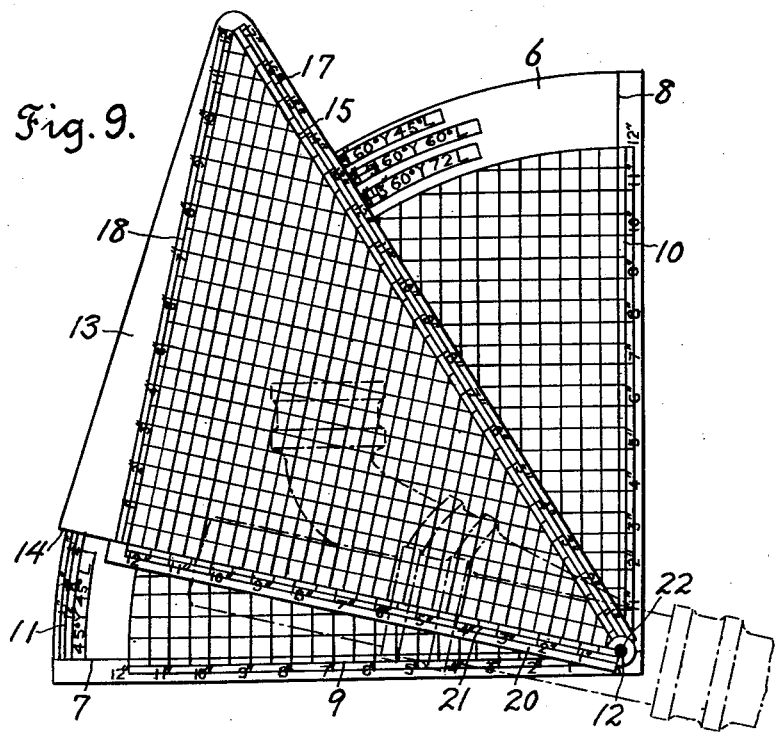
Fig. 9 is a plan view of the above members under usage.

Now, as shown in Figs. 2 and 3, let the numeral 23 denote the intersection point of the axis of the branched pipe 2 and the center line of the end of the bend pipe 4, and provided that (1) $a$ shows a slope of the main pipe 1;
(2) $b$ shows the projection of said main pipe gotten in between the points 5 and 23 to the horizontal plane;
(3) $c$ shows the projection of the distance from 23 to the axis of said main pipe to the plane;
(4) $d$ shows the height of 23;
(5) $e$ shows the actual length of the branched pipe 2 between 5 and 23; and
(6) $f$ shows the projection of said branched pipe to said plane, then, in case of using the 45° Y and 45° L, as shown in Fig. 9, (1) $a$ is previously determined;
(2) $b$ appears on the coordinate axis 7 of the coordinate plate 6;
(3) $c$ can be obtained by measuring the intersection point of the longitudinal graduation line at $b$ on the coordinate axis 7 of the coordinate plate 6 and the angle side 14 of the bend angle plate 13 along said longitudinal graduation line with the auxiliary scale 20, after putting the hole 19 of said bend angle plate on the pin 12 of said coordinate plate and setting said angle side on the pre-determined slope $a$ of the curved graduation 11;
(4) $f$ can be obtained by measuring said intersection point along the angle side 14;
(5) $d$ is the length of the longitudinal graduation line of the bend angle plate 13 at said intersection point; and
(6) $e$ is the graduation at a point, at which said longitudinal graduation line at said intersection point intersects the angle side 15.

Figure 10:
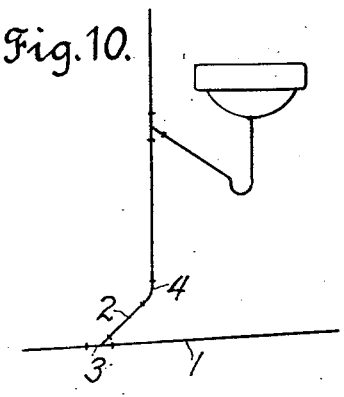
Fig. 10 is an elevational sketch of a piping system.
Figure 11:
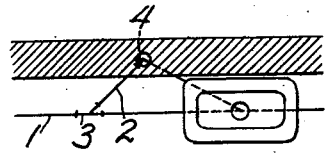
Fig. 11 is a plan sketch of the above.

Next, I will explain how to use my invented device in case that, for example, a 45° Y and a 45° L are used and that $a$ and $b$ are 1 and 7 inches, respectively, in such a piping system as shown in Figs. 10 and 11.

Putting the hole 19 of the bend angle plate 13 on the pin 12 of the coordinate plate 6 and setting the angle side 14 on the mark 1" of the curved graduation 11, 3" is obtained for $c$ by measuring the intersection point of the longitudinal graduation line at the mark 7" on the coordinate axis 7 and said angle side along said longitudinal graduation line with the auxiliary scale 20; 7$\frac{9}{16}$" is obtained for $f$ by measuring said intersection point along said angle side; 7$\frac{9}{16}$" is obtained for $d$ by reading the graduation 18 corresponding to the longitudinal graduation line of the bend angle plate 13 at said intersection point; and 10$\frac{3}{4}$" is obtained for $e$ by reading the graduation 17 at a point at which said longitudinal graduation line intersects the angle side 15.

Thus the device according to my invention is composed of the coordinate plate, the bend angle plate having the bend angle and the auxiliary scale, and is enabled to easily measure the necessary lengths for a piping system on the desk, in which the main pipe is branched by using a Y pipe and the end of a bend pipe at the branch end is kept vertical, and is most efficient in case of said main pipe having a slope.

What I claim is:

A piping length measuring device, which consists of a coordinate plate having curved graduations between coordinate axes, each of which shows the relation between the slope of the main pipe and the projection of the branch angle of a Y pipe to the horizontal plane varying in accordance with said slope which is necessary for keeping the end of the branched pipe vertical, and having graduations of length on said coordinate axes, a bend angle plate having the bend angle of a bend pipe connected with the branch end between angle sides and having graduations of length along one of said angle sides and another side normal to the other angle side, and an auxiliary scale having a graduation of length.

References Cited in the file of this patent

UNITED STATES PATENTS

| 886,695   | Greenier   | May 5, 1908  |
| 1,172,510 | Williamson | Feb. 22, 1916 |
| 1,808,981 | Glass      | June 9, 1931 |

FOREIGN PATENTS

| 905,893 | Germany | Mar. 8, 1954 |